United States Patent [19] [11] 3,927,758
Gregor [45] Dec. 23, 1975

[54] AUTOMATIC MATERIAL-HANDLING APPARATUS

[76] Inventor: Vaughn Gregor, 465 Castle Place, Beverly Hills, Calif. 90210

[22] Filed: July 29, 1974

[21] Appl. No.: 492,466

[52] U.S. Cl.............. 198/89; 198/93; 198/220 BA
[51] Int. Cl.² ..................................... B65G 37/00
[58] Field of Search... 198/89, 106, 220 A, 220 BA, 198/84, 93, 92, 102; 214/301, 302

[56] References Cited
UNITED STATES PATENTS

| | | | |
|---|---|---|---|
| 2,333,338 | 11/1943 | Rapp | 198/220 A |
| 3,184,037 | 5/1965 | Greaves et al. | 198/89 |
| 3,550,752 | 12/1970 | Gregor | 198/106 |
| 3,587,827 | 6/1971 | Schoen | 198/106 |
| 3,638,279 | 2/1972 | Swados | 198/84 |
| 3,767,031 | 10/1973 | Gorgei et al. | 198/92 |

FOREIGN PATENTS OR APPLICATIONS

| 56,179 | 4/1944 | Netherlands | 198/89 |
|---|---|---|---|

Primary Examiner—Richard A. Schacher
Assistant Examiner—James M. Slattery
Attorney, Agent, or Firm—Fulwider, Patton, Rieber, Lee & Utecht

[57] ABSTRACT

A surge-storage machine having an elongated vibratory conveyor serving as a storage conveyor and discharging material for delivery to a using system, and having a second elongated vibratory conveyor for receiving incoming material at a fixed supply point and building a layer of the material from the discharge end of the storage conveyor toward its opposite end. The distributing conveyor is supported above the storage conveyor for longitudinal reciprocating movement by a cable drive mechanism in parallel with the storage conveyor, for movement of the discharge end of the distributing conveyor along the length of the storage conveyor while at least part of the distributing conveyor remains at all times beneath the supply point. A conventional sensing control system is provided for the drive mechanism.

17 Claims, 6 Drawing Figures

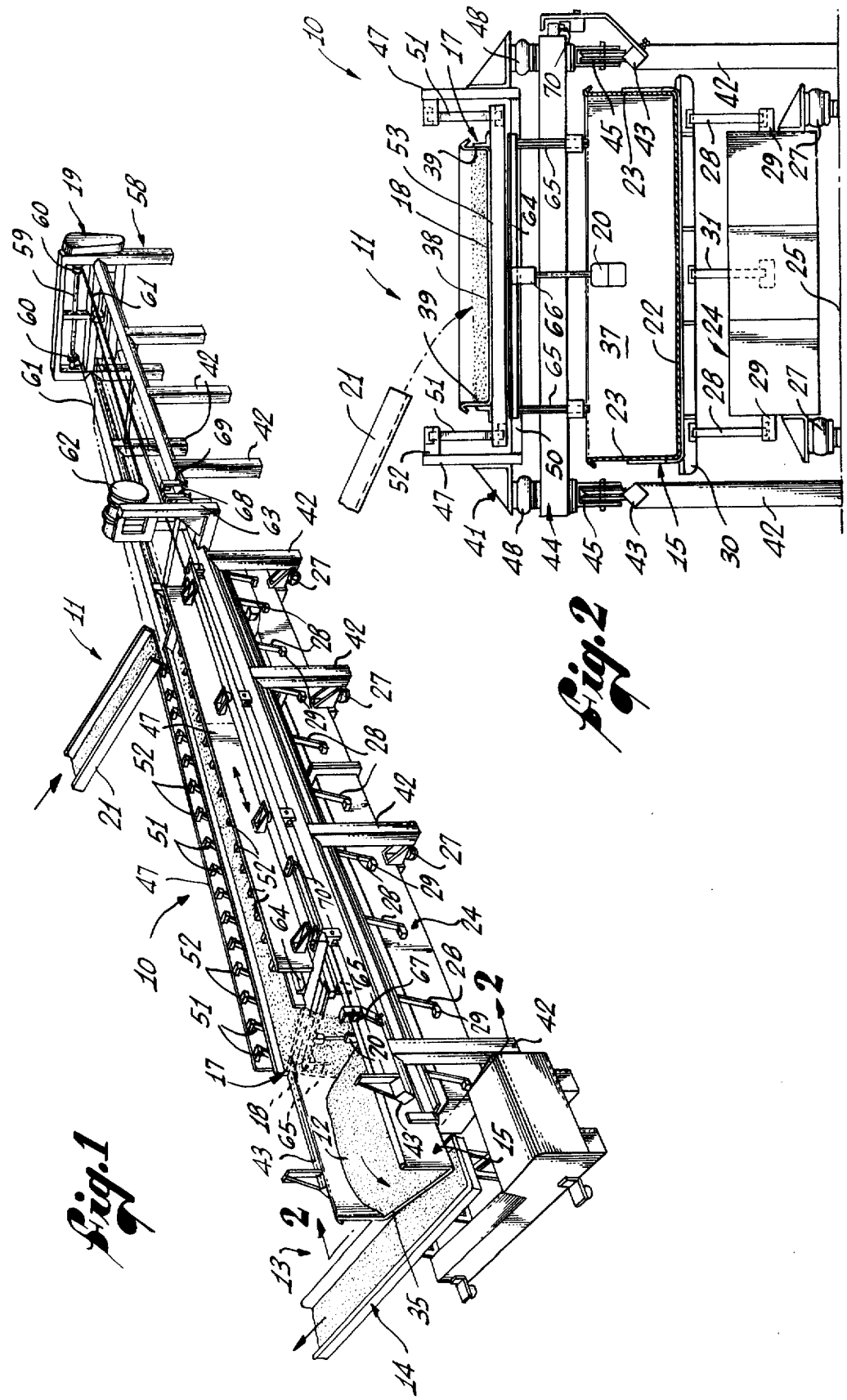

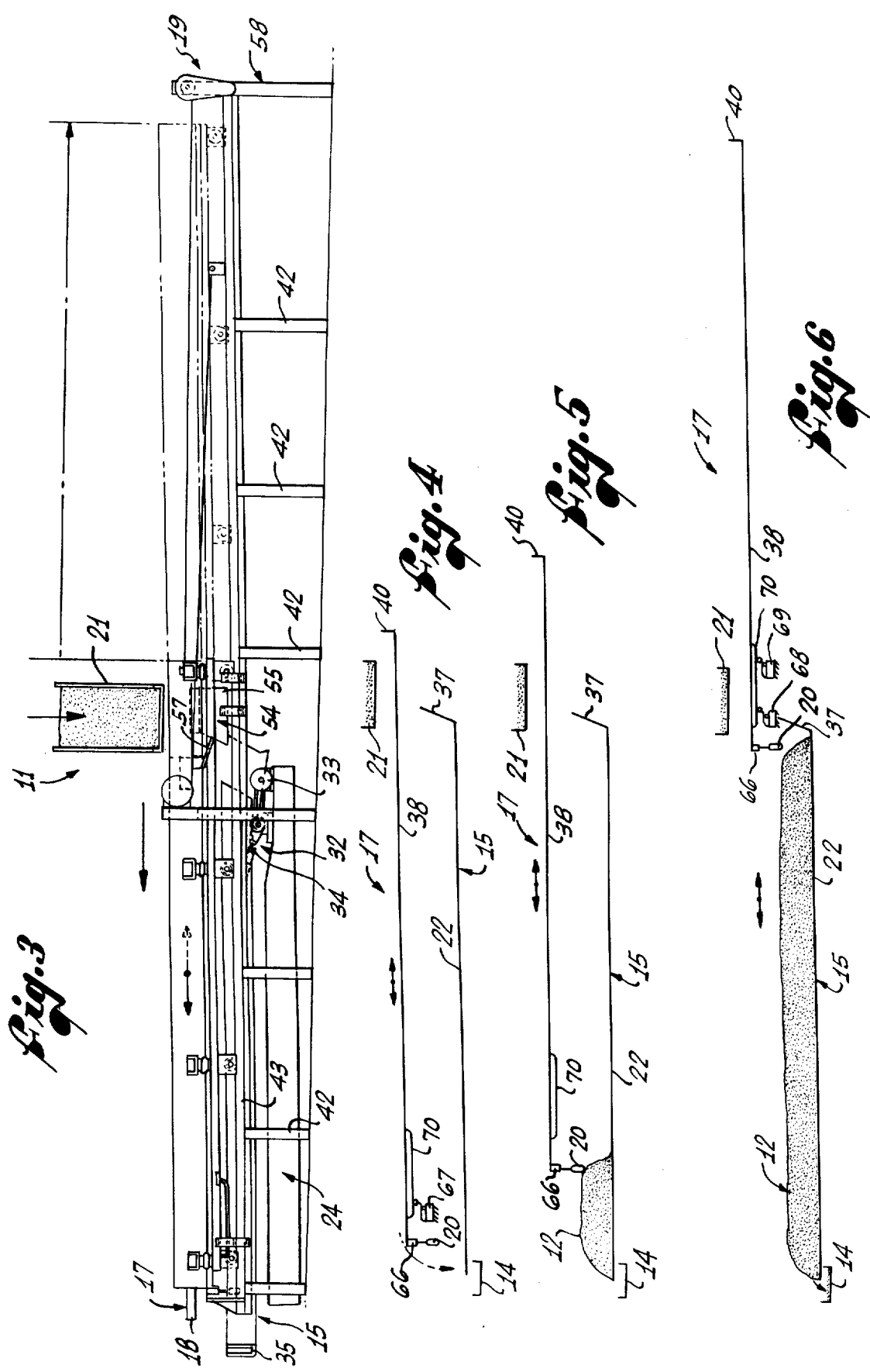

AUTOMATIC MATERIAL-HANDLING APPARATUS

BACKGROUND OF THE INVENTION

This invention relates to material-handling apparatus, and has particular reference to an apparatus for receiving an input flow of bulk material, such as a dry food product, and discharging the material as needed by a using system, such as a group of machines for packaging the dry food product.

Representative products with which this apparatus might be used are potato chips, cookies, noodles, and other materials having relatively low mass. In the processing of such products, the output of a production line is delivered to the packaging machines through a distribution system that typically includes a surge-storage apparatus, for accumulating product when the output of the production line exceeds the demand of the packaging machines, and delivering the product, on demand, to the packaging machines.

One example of such a surge-storage apparatus, shown and described in U.S. Pat. No. 3,550,752, received the input flow in a bucket conveyor which transferred the product to an elongated storage receptacle, the bottom of the receptacle being a conveyor for feeding the material toward a discharge station at one end of the receptacle. To insure that the product was discharged on a first-in/first-out basis, the bucket conveyor delivered the product to a feed chute that was movable longitudinally of the main receptacle, and its movements were controlled in response to the sensed position of the product previously delivered to the receptacle, to build a layer of the product progressively from the discharge end toward the opposite end of the receptacle. The bucket conveyor was designed to dump product onto the feed chute wherever the chute was located along the main receptacle.

In the operation of a system including an apparatus of this type, the storage conveyor discharges product from the receptacle as needed by the using system, thus moving the layer of stored material toward the discharge end at a variable rate. The rate of delivery of material to the feed chute for distribution to the storage receptacle is unrelated to the rate of discharge from the storage receptacle, so the position of the upstream end of the layer of stored material is sensed, and the feed chute is automatically controlled to discharge incoming material at the upstream end of the layer.

While the apparatus of the aforesaid patent satisfactorily performed all of its intended functions, the bucket conveyor was relatively expensive in construction and required careful and frequent attention to maintain the high standards of sanitation necessary in food processing. The primary object of the present invention is to provide an improved and simplified apparatus of the foregoing general character which performs substantially the same functions without need for such a bucket conveyor.

SUMMARY OF THE INVENTION

In the apparatus of the present invention, the bucket conveyor and the feed chute of the patented apparatus are replaced by a single, elongated distributing conveyor which parallels the storage conveyor in side-by-side relation therewith, and is mounted for longitudinal reciprocation with its discharge end at all times overlying the storage conveyor, and with some portion of the distributing conveyor disposed, at all times, beneath the supply point to receive incoming product. The discharge end of the distributing conveyor is movable from one extreme position, adjacent the discharge end of the storage conveyor, to an opposite extreme position, adjacent the opposite end of the storage conveyor, through a range of longitudinal movement that is less than the length of the distributing conveyor.

In the preferred embodiment shown herein for purposes of illustration, the two conveyors are of substantially the same length and are in vertically spaced side-by-side relation, and the distributing conveyor is movable endwise from one extreme position in which its discharge end overlies the storage conveyor close to the discharge end thereof, to an opposite extreme position in which there is a slight longitudinal overlap of the two conveyors. Preferably, vibratory conveyors are used, the storage conveyor being supported for longitudinal vibratory movement on a suitable base and the distributing conveyor being supported on a car that is movable along tracks on the opposite sides of the storage conveyor. A power drive mechanism is provided to move the car along the tracks.

With the foregoing arrangement, the apparatus can be located beneath a supply point, and fed by a stationary conveyor for releasing product over the end portion of the storage conveyor opposite its discharge end. Some portion of the distributing conveyor always is positioned to receive the product at this point, regardless of the position of the distributing conveyor along its path of reciprocation.

The control of the operation of this apparatus can be accomplished in a manner substantially the same as used for the apparatus in the aforesaid patent. For this purpose, a sensor is provided at the discharge end of the distributing conveyor to sense the presence of product at a predetermined level on the storage conveyor, and to control the power drive mechanism for moving the car, thereby to build a layer of product on the storage conveyor from its discharge end progressively toward the opposite end.

Other aspects and advantages of the invention, including more detailed features of its construction, will become apparent from the following detailed description, taken in conjunction with the accompanying drawings.

BRIEF DESCRIPTION OF THE DRAWINGS

FIG. 1 is a perspective view of a material-handling apparatus embodying the novel features of the present invention, shown with product being delivered through a supply chute, a quantity of the product stored adjacent the discharge end of the storage conveyor and discharged product being conveyed away from the apparatus by a conveyor for feeding the supplied system;

FIG. 2 is an enlarged view, partly in cross-section, taken substantially along line 2—2 of FIG. 1;

FIG. 3 is a somewhat diagrammatic side elevation showing the apparatus of FIG. 1 in substantially the same scale, with the distributing conveyor in a moved position;

FIG. 4 is a diagrammatic view illustrating the starting condition of the two conveyors;

FIG. 5 is a view similar to FIG. 4 illustrating an intermediate condition, similar to the condition in FIG. 1; and FIG. 6 is a view similar to FIGS. 4 and 5 illustrating the condition of the two conveyors when the storage conveyor has been substantially fully loaded.

DETAILED DESCRIPTION

As shown in the drawings for purposes of illustration, the invention is embodied in an automatic machine, indicated generally by the reference number 10, for receiving a bulk product such as potato chips from a source (not shown) at a supply station 11, storing the product in an elongated layer 12 of varying length, and discharging the product, upon demand, at a discharge station 13, for delivery to a using system (not shown) such as a group of packaging machines. In this instance, a conveyor 14 receives the product from the machine at the discharge station 13, and carries it to the using system.

In general, the improved machine 10 comprises an elongated storage conveyor 15 for holding the layer 12 of product ready for discharge to the using system upon demand, and an elongated distributing conveyor 17 which is movably supported in parallel relation with the storage conveyor. The distributing conveyor has a discharge end 18 that overlies the storage conveyor to move along the latter as the distributing conveyor reciprocates longitudinally relative to the storage conveyor, between one extreme position in which the two conveyors are substantially longitudinally coextensive and their discharge ends are substantially longitudinally aligned, and an opposite extreme position in which the two conveyors are in longitudinally overlapped condition with the discharge end of the distributing conveyor overlying the end portion of the storage conveyor opposite its discharge end.

A power drive mechanism 19 is provided for moving the distributing conveyor 17 relative to the storage conveyor 15 between the foregoing extreme positions, and a sensor 20 is provided to control the drive mechanism so that the distributing conveyor 11 finds the upstream end of the layer 12 and discharges incoming product behind this layer, for eventual discharge of product to the using system on a first-in/first-out basis, as in the aforesaid patent. Because there is always a portion of the distributing conveyor in longitudinal alignment with the upstream end portion of the storage conveyor, the product can be delivered to the machine at the supply station 11 by a stationary input device, herein a supply chute 21 that preferably is part of a vibratory input conveyor.

More specifically, as shown most clearly in FIGS. 1 and 2, the material holding and conveying element of the storage conveyor 15 is an elongated receptacle, preferably a tray of generally U-shaped cross-section having a flat bottom wall 22 and upstanding longitudinal sidewalls 23, and is mounted on a base 24 for longitudinal vibratory movement to advance material in one direction, herein from right to left, as viewed in FIGS. 1 and 3, in a manner that is well known to those skilled in the vibratory conveyor art. In this instance, the base 24 is formed by two or more elongated beams of rectangular cross-section that are supported above a floor 25 by vibration-isolating mounts 27 (see FIG. 2). A series of longitudinally flexible spring legs 28 on each side of the base 24 movably supports the tray on the base. Each spring leg is inclined upwardly and to the right, as viewed in FIG. 1, and has a lower end anchored in a bracket 29 on the side of the base and an upper end secured to a crossbar 30 on the underside of the tray. Additional spring legs 31 may be provided between the beams, as desired for additional support.

Adjacent the right or upstream end of the conveyor 15 is a selectively operable vibrator 32 (see FIG. 3), that may be selected from various well known types, for imparting longitudinal vibratory movement to the tray and causing material thereon to move longitudinally along the tray. It should be sufficient to note that the vibrator 32 has a motor 33 which produces the vibratory motion, and that this motion is transmitted to conveyor tray by a connector 34.

The left end 35 of the bottom wall 22 constitutes the discharge end of the storage conveyor 15, and preferably is inclined to discharge the product across the width of the conveyor 14. The opposite end of the tray is closed by an end wall 37 for preventing accidental discharge of product at this end of the conveyor.

The distributing conveyor 17 also has an elongated tray which serves as its conveying element, but this tray may be substantially shallower than the tray of the storage conveyor 15 because it is not expected to store any product. As shown in FIGS. 1 and 2, the distributing tray has a flat bottom wall 38 somewhat narrower than the bottom wall 22, two relatively short longitudinal sidewalls 39, and an end wall 40 closing the right or upstream end of the tray, the left end of the bottom wall 38 constituting the discharge end 18 of the conveyor.

For transverse compactness and simplicity of construction and operation, the distributing conveyor 17 is supported in vertically spaced overlying relation with the storage conveyor 15. For this purpose, the distributing conveyor is mounted on a car 41 that is movably supported on an elongated supporting structure which straddles the storage conveyor 15 and extends far enough beyond the upstream end 31 thereof to support the distributing conveyor with its discharge end 18 over the upstream end portion of the storage conveyor.

Specifically, in the preferred embodiment shown herein, the supporting structure is formed by two rows of upright posts 42 extending along the opposite sides of the storage conveyor 15, from adjacent its discharge end 35 to well beyond its upstream end 37, and two elongated bars 43 that are mounted on the upper ends of the posts to serve as tracks for the car 41.

As shown most clearly in FIG. 2, the car 41 comprises a frame 44 constituting the body of the car, and having rollers 45 on its underside for riding on the track bars 43. The tray of the distributing conveyor 17 is disposed above the body between two longitudinal side rails 47, which are mounted on a series of vibration-isolating elements 48 engaging laterally projecting brackets 49 on the outer sides of the side rails. The side rails preferably are tied together by crossbars 50 below the level of the distributing tray.

To mount the distributing tray on the car 41, two rows of spring legs 51 are fastened at their upper ends to two rows of lugs 52 that are mounted on the adjacent sides of the side rails 47. The spring legs are inclined downwardly and to the left (FIG. 1) from the lugs to the projecting ends of a series of crossbars 53, which are disposed beneath the distributing tray and are fastened thereto.

Longitudinal vibratory movement of the distributing tray relative to the car 41 is produced by a vibrator unit 54 (see FIG. 3) that is carried on the car frame 44 beneath the right end of the car. This unit includes a vibrator 55 that is suspended from the underside of the car frame, and a connecting element 57 that is fastened to the underside of the tray to transmit vibration to the tray for moving product thereon toward the discharge end 18, from right to left in FIGS. 1 and 3. Again, the different types of vibrators suitable for this purpose are known to those skilled in the art.

In the foregoing manner, the distributing conveyor 17 is supported for back-and-forth movement above the storage conveyor 15, to position the discharge end 18 above any selected portion of the storage conveyor. The power drive mechanism 19 for controlling this movement is mounted on an end frame 58 at the right end of the supporting structure, and includes a motor for driving a shaft 59 that is journaled at its ends on the two legs of the end frame and carries two drive pulleys 60. These pulleys support cables 61 which are connected to the car 41 at the right end thereof, to pull the car toward the end frame as the pulleys are turned in one direction to wind up the cables.

Although the conveyors can be made perfectly horizontal and the drive mechanism 19 can be designed to move the car positively in both directions, the illustrative embodiment relies upon gravity for movement in one direction, to the left in FIGS. 1 and 3, and provides positive drive only for movement to the right, paying out the cables 61 to permit movement to the left. The track bars 43 are generally horizontal, but are inclined downwardly to the left, as shown most clearly in FIG. 3, with a slope that is sufficiently great to cause the car 41 to move to the left as the cables 61 are extended.

To provide electrical connections for the electrical elements on the car 41, that is, for the vibrator unit 54 and the sensor 20, a reel unit 62 is mounted on the supporting structure to pay out and reel in electrical lines as the car moves back and forth along the track bars 43. In this instance, this reel unit is mounted on the side of the supporting structure adjacent the supply station 11 on an L-shaped support 63.

The control system for the improved machine 10 may be basically similar to the control system described in the aforesaid patent, using as the primary element of the control the sensor 20, which in this case depends from the distributing conveyor tray adjacent the discharge end 18. The sensor is mounted on a transverse bar 64, which is adjustably positioned on two supports 65 to vary the level of the sensor, and also may be adjustable longitudinally relative to the discharge end 18. Positioned in this manner, the sensor finds the upstream end of the layer 12, and controls the drive mechanism 19 accordingly.

While control signals may be produced in various ways, the preferred way has been to provide a switch 66 which is actuated by back-and-forth swinging of the sensor 18, and to control the operations of the drive mechanism with this switch. Since the drive mechanism may be operated by the sensor in substantially the same manner as the drive for the reciprocating feed chute in the aforesaid patent, reference is made to that patent for details not disclosed herein.

In addition to the vibrators 32 and 54, the probe 20 and its switch 64, and the drive mechanism 19, the illustrative control system includes three limit switches 67, 68 and 69 that are positioned along the path of movement of the distributing conveyor 17 to be actuated in different positions of the conveyor, herein by a cam actuator 70 mounted for movement with the conveyor. As shown in FIGS. 1 and 2, the cam actuator is mounted on one side of the frame 44 of the car 41, the right side in FIG. 2, and the switches 67, 68 and 69 are spaced apart along the path followed by this actuator during movement of the car along the track bars 43.

The switch 67 is a forward-limit switch which is engaged by the cam actuator 70 as the distributing conveyor 17 reaches its forwardmost position, shown in FIG. 3 and schematically illustrated in FIG. 4. The switches 68 and 69 are spaced a short distance apart, longitudinally of the conveyor and adjacent the supply station 11, for successive engagement with the cam actuator 70 as the distributing conveyor 17 approaches its opposite extreme position, shown schematically in FIG. 6. The switch 68 is actuated first, and produces an alarm signal which can be used to actuate a buzzer or the like (not shown) for indicating that the storage conveyor 15 is nearly loaded to capacity.

The switch 69 is a rear-limit switch, and is engaged by the cam actuator 70 before the discharge end 18 of the distributing conveyor reaches the upstream end 37 of the storage conveyor 15, to deactivate the drive mechanism 19 and terminate movement of the distributing conveyor. The cam actuator 70 is long enough to remain in engagement with the alarm switch 68 when it engages the limit switch 69, so that the alarm signal continues until the system is shut down.

BRIEF OPERATIONAL SUMMARY

Although the manner of operation of the machine 10 and the associated parts of the overall system should be apparent from the foregoing detailed description, the following brief operational summary may provide an increased understanding of the operation and features of the machine. Assuming that the machine has been shut down with no product on either of the conveyors 15 and 17, and with the distributing conveyor in a position between the two extreme positions shown in FIGS. 4 and 6, and assuming further that the supply system has been put in operation to begin delivering product to the machine by way of the vibratory conveyor chute 21, all that is necessary to put the machine in operation is the activation of its controls by turning on a "start" switch (not shown).

When the controls are activated, the vibrator unit 54 begins vibrating the distributing tray to advance product toward the discharge end 18, and the drive mechanism 19 advances the distributing conveyor 17 to the left (FIG. 4), toward the discharge end 35 of the storage conveyor 15. Since there is no product on this conveyor to engage the sensor 20, the distributing conveyor continues to the left until the cam actuator 70 engages the switch 67, signaling that the distributing conveyor is at its left extreme position.

This signal reverses the drive mechanism 19 to back up the distributing conveyor 17, either until the actuator 70 clears the switch 67 or, if desired, for a timed interval of operation to space the actuator a preselected distance from the switch. Then, after a preselected time delay, the drive mechanism again advances the distributing conveyor to find the end of the layer of product, if any, on the storage conveyor.

If the product has not yet been deposited on the storage conveyor 15 to a sufficient depth to engage the sensor 20 before the switch 67 is actuated, the above process is repeated. If, however, the layer 12 has been formed, the sensor 20 engages the upstream end of the layer, and the switch 66 produces the same control signal that was produced by the switch 67 in the initial forward stroke. The switches 66 and 67 are in parallel in the circuit of the drive mechanism 19, and each, when actuated, causes the distributing conveyor 17 to back up and stop in a position upstream along the storage conveyor 15 from the layer 12 of product.

This sequence of operations continues as long as the machine 10 remains in operation and if no product is discharged from the storage conveyor 15, the layer 12 is built up progressively along the storage conveyor, toward the upstream end 37 thereof. On the other hand, when the using system is in operation, its demands activate the vibrator unit 32 of the storage conveyor, which advances the layer 12 to the left and discharges product to the conveyor 14 for delivery to the using system. Typically, the storage conveyor will operate intermittently, in response to varying demand from the using system, just as the input conveyor 21 may operate intermittently because of varying output by the supply system.

Regardless of the length of the layer 12, however, the distributing conveyor 17 periodically seeks and finds the upstream end of the layer and backs up to discharge product adjacent the upstream end. If the input should exceed the demand for a prolonged period of time, the progressive build-up of the layer 12 toward the upstream end of the storage conveyor 15 will result in movement of the distributing conveyor 17 farther and farther to the right.

To warn that the storage conveyor 15 is approaching its storage capacity, the cam actuator 70 engages the alarm switch when the distributing conveyor 17 is near its extreme position. Then, if supply continues to exceed demand, the distributing conveyor moves far enough to the left to bring the cam actuator 70 into engagement with the stop switch 69, and this shuts down the distributing conveyor.

At this stage, of course, attention must be given to the supply system, to stop the supply of product. It is to be noted, however, that the capacity of the storage conveyor will be made large enough so that this situation will arise only under extraordinary circumstances.

From the foregoing, it will be evident that the present invention provides a significantly improved and simplified apparatus, as compared to the predecessor apparatus in the aforesaid patent. It also will be apparent that, while one specific embodiment has been illustrated and described, various modifications and changes may be made without departing from the spirit and scope of the invention.

I claim:
1. In an automatic material-handling apparatus for receiving an input flow of bulk material at a supply station, accumulating material for delivery to a using system, and discharging material to the system at a discharge station according to the needs of the system, the combination of:
   an elongated storage conveyor comprising:
   a base,
   a first elongated vibratory conveyor tray mounted on said base for longitudinal vibratory movement and having a generally flat and horizontal bottom wall, upstanding longitudinal sidewalls for holding a substantial depth of material, a discharge end adapted to be positioned at the discharge station, and an opposite end adapted to be positioned adjacent the supply station,
   and selectively operable vibrating means acting between said base and said tray to impart longitudinal vibratory movement to the tray to feed material thereon toward and off said discharge end;
   an elongated distributing conveyor comprising:
   an elongated supporting structure extending longitudinally of said storage conveyor and including generally horizontal tracks disposed on opposite sides thereof and extending from adjacent said discharge end to beyond said opposite end,
   a car mounted on said tracks for back-and-forth movement, longitudinally of said storage conveyor,
   a second elongated vibratory conveyor tray disposed above said first conveyor tray and generally centered thereon, said second tray being approximately the same length as said first tray, having a discharge end at the end thereof adjacent the discharge end of said first tray, and being supported on said car for longitudinal vibratory movement,
   said supporting structure extending beyond said storage conveyor a distance approximately equal to the length of said second tray,
   and second vibrating means acting between said second tray and said car to impart longitudinal vibratory movement to the second tray to feed material thereon toward and off the discharge end to said first tray;
   drive mechanism for moving said car back and forth along said tracks to move said distributing conveyor endwise above said storage conveyor through a range of movement less than the full length of said second tray, thereby to move the discharge end of the second tray from one extreme position overlying said first tray adjacent its discharge end, to an opposite extreme position overlying the opposite end portion of the first tray;
   means for delivering material to the second tray at the supply station in all of the positions of the second tray within said range of movement;
   and means adjacent the discharge end of said second tray for sensing the presence of material at a predetermined level on said first tray and controlling said drive mechanism to position said distributing conveyor for discharge of material to said storage conveyor.

2. Automatic material-handling apparatus as defined in claim 1 in which said drive mechanism comprises a drive motor at the end of said supporting structure opposite said storage conveyor, and cable drive means operable by said motor to move said car along said tracks.

3. Automatic material-handling apparatus as defined in claim 2 in which said tracks are inclined downwardly toward the discharge end of said storage conveyor and said car is movable along said tracks by gravity in one direction, and pulled in the opposite direction by said cable drive means.

4. Automatic material-handling apparatus as defined in claim 1 in which said sensing means comprises a sensor suspended beneath the discharge end portion of said second tray for engagement with material on said first tray.

5. Automatic material-handling apparatus as defined in claim 1 in which said means for delivering material at the supply station comprises a supply conveyor stationarily supported above the path of said second tray at said supply station, to overlie the portion of the second tray adjacent the end thereof opposite the discharge end when the second tray is in said one extreme position, and to overlie the opposite end portion of the second tray when the latter is in said opposite extreme position.

6. Automatic material-handling apparatus as defined in claim 1 further including a discharge conveyor at said discharge station for receiving material from said storage conveyor and conveying discharged material to the using system.

7. In an automatic material-handling apparatus for receiving bulk material at a supply station, storing the material for delivery to a using system, and discharging the material at a discharge station, the combination of:
   a first elongated storage and discharge conveyor having means for receiving and holding material and for discharging material at a discharge station at one end of the conveyor;
   means for operating said first conveyor selectively to discharge material at said discharge station;
   a second elongated conveyor mounted for back-and-forth endwise movement in parallel relation with said first conveyor, and having a distributing end movable along substantially the full length of said first conveyor during such endwise movement to distribute material in a layer along substantially the full length thereof;
   drive means for moving said second conveyor longitudinally relative to said first conveyor and independently thereof, between a first extreme position in which said conveyors are longitudinally overlapped and said distributing end is adjacent the end of said first conveyor opposite said one end, the range of movement of said second conveyor being less than its full length;
   means for supplying material to said second conveyor at the supply station, and located in general longitudinal alignment with said opposite end of said first conveyor and in overlying relation with said second conveyor whereby material can be supplied to the second conveyor in the area where the second conveyor always is in position to receive the material;
   and control means for operating said drive means to distribute material from said second conveyor along said first conveyor in a layer from said one end toward the other end thereof, and to add material to the layer from the end thereof opposite said one end of said first conveyor.

8. Automatic material-handling apparatus as defined in claim 7 in which said first conveyor is a selectively operable vibratory conveyor, and has an elongated tray of substantial depth for receiving and storing material.

9. Automatic material-handling apparatus as defined in claim 8 in which said second conveyor also is a vibratory conveyor, and has an elongated second tray narrower than the tray of said first conveyor and positioned in centered, overlying relation above the tray of said first conveyor.

10. Automatic material-handling apparatus as defined in claim 9 in which said second conveyor is supported above said first conveyor by means of an elongated supporting structure defining a track extending along said first conveyor and beyond the upstream end thereof, and a car movable along said track, said second tray being mounted on said car for movement therewith and for longitudinal vibratory movement relative to the car.

11. In an automatic material-handling apparatus for receiving an input flow of bulk material at a supply station, accumulating material for delivery to a using system, and discharging material to the using system at a discharge station according to the needs of the using system, the combination of:
   an elongated storage conveyor unit comprising:
      a base,
      a first elongated conveyor mounted on said base for longitudinal feeding movement, said storage conveyor unit having upstanding longitudinal sidewalls for holding a substantial depth of material in a layer, and also having a discharge end adapted to be positioned at the discharge station, and an opposite end adapted to be positioned adjacent the supply station,
      and selectively operable means for driving said first conveyor to feed material thereon toward and off said discharge end;
   an elongated distributing conveyor unit comprising:
      a second elongated conveyor disposed in parallel, side-by-side relation with said first conveyor and having a distributing end overlying said first conveyor, said second conveyor being of approximately the same length as said first conveyor,
      means for driving said second conveyor to feed material thereon toward said distributing end for discharge to said second conveyor;
   means mounting said second conveyor on said apparatus for back-and-forth endwise movement relative to said first conveyor, in parallel therewith, through a range of movement sufficient to move said distributing end from one extreme position overlying said first conveyor adjacent its discharge end, to an opposite extreme position overlying the first conveyor adjacent its opposite end, the supply station being located to deliver material to a part of said second conveyor in all positions of the latter within said range of movement;
   drive means for moving said second conveyor back and forth relative to said storage conveyor unit through said range of movement to position said distributing end along said first conveyor in various positions between said extreme positions;
   and control means including sensing means adjacent said distributing end for sensing the presence of material at a predetermined level on said first conveyor and operating said drive means to position said second conveyor for discharge of material to said first conveyor.

12. Automatic material-handling apparatus as defined in claim 11 in which said distributing conveyor unit is mounted in overlying relation with said storage conveyor unit, and in vertical alignment therewith, and said distributing end discharges material longitudinally from said second conveyor.

13. Automatic material-handling apparatus as defined in claim 12 in which said mounting means for said second conveyor comprise tracks disposed on opposite sides of said storage conveyor unit and extending longitudinally thereof, beyond said opposite end of said first conveyor, and a car movable on said tracks and carrying said second conveyor.

14. Automatic material-handling apparatus as defined in claim 13 in which said tracks extend beyond said opposite end a distance approximately equal to the length of said second conveyor.

15. Automatic material-handling apparatus as defined in claim 11 in which said storage conveyor unit is a vibratory conveyor unit.

16. Automatic material-handling apparatus as defined in claim 11 in which said distributing conveyor unit is a vibratory conveyor unit.

17. Automatic material-handling apparatus as defined in claim 11 further including a supply chute stationarily mounted at said supply station, adjacent said opposite end of said first conveyor and in overlying relation with said second conveyor, to supply material to the second conveyor in all of its positions within said range.

* * * * *